US012624211B2

(12) United States Patent (10) Patent No.: US 12,624,211 B2
Baumgardner et al. (45) **Date of Patent: *May 12, 2026**

(54) BIOBASED ASPHALT REJUVENATING EMULSION

(71) Applicant: ERGON ASPHALT & EMULSIONS, INC., Jackson, MS (US)

(72) Inventors: Gaylon L. Baumgardner, Jackson, MS (US); Paul A. Morris, St. Augustine, FL (US); Joel B. Shealey, Chandler, AR (US); William E. Grubba, Terre Haute, IN (US)

(73) Assignee: Ergon Asphalt & Emulsions, Inc., Jackson, MS (US)

(*) Notice: Subject to any disclaimer, the term of this patent is extended or adjusted under 35 U.S.C. 154(b) by 375 days.

This patent is subject to a terminal disclaimer.

(21) Appl. No.: 17/842,649

(22) Filed: Jun. 16, 2022

(65) Prior Publication Data

US 2022/0315766 A1 Oct. 6, 2022

Related U.S. Application Data

(63) Continuation of application No. 15/744,812, filed as application No. PCT/US2016/042495 on Jul. 15, 2016, now Pat. No. 11,390,750.

(60) Provisional application No. 62/262,701, filed on Dec. 3, 2015, provisional application No. 62/192,930, filed on Jul. 15, 2015.

(51) Int. Cl.
*C08L 95/00* (2006.01)
*C08L 91/00* (2006.01)
*E01C 7/18* (2006.01)

(52) U.S. Cl.
CPC ............. *C08L 95/005* (2013.01); *C08L 91/00* (2013.01); *E01C 7/187* (2013.01); *C08L 2555/28* (2013.01); *C08L 2555/34* (2013.01); *C08L 2555/64* (2013.01); *C08L 2555/80* (2013.01)

(58) Field of Classification Search
CPC ......... C08L 95/00; C08L 95/005; E01C 7/187
See application file for complete search history.

(56) References Cited

U.S. PATENT DOCUMENTS

| | | | | |
|---|---|---|---|---|
| 2,483,806 | A | 10/1949 | Buckley et al. | |
| 4,492,781 | A | 1/1985 | Duszak et al. | |
| 5,364,894 | A * | 11/1994 | Portfolio | C08L 95/005 |
| | | | | 524/60 |
| 5,811,477 | A | 9/1998 | Burris et al. | |
| 6,902,610 | B2 | 6/2005 | Guerin et al. | |
| 7,275,890 | B2 | 10/2007 | Thomas et al. | |
| 7,357,594 | B2 | 4/2008 | Takamura | |
| 8,702,857 | B2 | 4/2014 | Venema et al. | |
| 8,814,464 | B2 | 8/2014 | McDade et al. | |
| 8,821,064 | B1 * | 9/2014 | Morris | C09D 195/005 |
| | | | | 404/75 |
| 11,390,750 | B2 * | 7/2022 | Baumgardner | E01C 7/187 |
| 2008/0028978 | A1 * | 2/2008 | Twining | G10K 11/162 |
| | | | | 252/62 |
| 2010/0034586 | A1 | 2/2010 | Bailey et al. | |
| 2012/0063843 | A1 | 3/2012 | Blacklidge | |
| 2012/0315088 | A1 * | 12/2012 | Deneuvillers | E01C 7/187 |
| | | | | 106/269 |
| 2014/0230693 | A1 | 8/2014 | Gonalez et al. | |
| 2014/0234027 | A1 | 8/2014 | Morris | |
| 2015/0087753 | A1 * | 3/2015 | Koleas | C09D 195/00 |
| | | | | 524/71 |

FOREIGN PATENT DOCUMENTS

| | | |
|---|---|---|
| GB | 2462371 | 10/2010 |
| KR | 2010-0080510 A | 7/2010 |
| WO | WO 1997/035940 A | 10/1997 |
| WO | WO 2008/084014 A1 | 7/2008 |
| WO | WO 2009/113854 A1 | 9/2009 |
| WO | WO 2010/110651 A1 | 9/2010 |
| WO | WO 2013/090283 A1 | 6/2013 |
| WO | WO 2013/163467 A1 | 10/2013 |

OTHER PUBLICATIONS

International Search Report and Written Opinion for corresponding International Application No. PCT/US2016/042495 mailed on Oct. 14, 2016; 17 pages.
Basic Asphalt Emulsion Manual, Chapter 1, MS-19, Fourth Edition, Asphalt Institute , Inc., 21 pages (2008).
Basic Asphalt Emulsion Manual, Chapter 8, MS-19, Fourth Edition, Asphalt Institute , Inc., 20 pages (2008).
Distress Identification Manual for the Long-Term Pavement Performance Program, Publication No. FHWA-HRT-13-092, U.S. Department of Transportation Federal Highway Administration, 146 pages (Revised May 2014).
Coons et al., "An Investigation of the Hardening of Asphalt Recovered from Pavements of Various Ages". (1965).
Amani Mohammad J. et al.: "Volume of mixing and solubility of water in Athabasca bitumen at high temperature and pressure," Fluid Phase Equilibria, Elsevier, Amsterdam NL, Aug. 1, 2013, 358: 203-211.
Hilder M.G.: "The solubility of water in edible oil and fats," Journal of the American Oil Chemists Society, Oct. 1, 1968, 45(10): 703-707.
Anonymous: "3.4 Emulsions" In: "Chemistry and technology of Surfactants," Blackwell Publishing Ltd. US, Jan. 2006, pp. 69-70.
Anonymous: "Emulsion—Wikipedia," Jul. 21, 2017, Retrieved from the Internet: URL: https://en.wikipedia.org/wiki/Emulsion#Emulsifiers [retrieved on Aug. 1, 2017].
Mickle et al., "Influence of emulsifier type and solubility on the stability of milk fat-water emulsions," Journal of Food Science, US, Apr. 1, 1971, 36(3): 423-425.
Titus et al., "Emulsifier efficiency in model systems of milk fat or soybean oil and water," Food Technology, Nov. 1, 1968, 22(11): 115-117.

(Continued)

*Primary Examiner* — Alexandra M Moore
(74) *Attorney, Agent, or Firm* — Husch Blackwell LLP

(57) ABSTRACT

A polymer-modified emulsion used for rejuvenating or repairing deteriorated asphalt pavement includes an asphalt phase containing an asphalt and a biobased rejuvenating agent, and an aqueous phase including water and an emulsifying agent, and one or more polymers included in the asphalt phase, the aqueous phase or both.

20 Claims, No Drawings

(56) References Cited

OTHER PUBLICATIONS

Brownridge, "The role of an asphalt rejuvenator in pavement preservation: use and need to asphalt rejuvenation," First International Conference on Pavement Preservation, Jan. 1, 2010, pp. 351-364.

Peiliang Cong et al., "Investigation of diffusion of rejuvenator in aged asphalt," International Journal of Pavement Research and Technology, Jul. 2016, 9(4): 280-288.

Karlsson et al., "Bitumen rejuvenator diffusion as influenced by ageing," Road Materials and Pavement Design, Jan. 2002, 3(2): 167-182.

Fang Ying et al., "Comprehensive review on the application of bio-rejuvenator in the regeneration of waste asphalt materials," May 21, 2021, vol. 295, 17 pages.

Hugener et al., "Cold asphalt recycling with 100% reclaimed asphalt pavement and vegetable oil-based rejuvenators," Road Materials and Pavement Design, Nov. 27, 2013, 15(2): 239-258.

Estakhri et al., "Effectiveness of fog seals and rejuvenators for bituminous pavement surfaces," Technical Report, Apr. 1991, pp. 1-112.

Meizhu et al., "Physical, chemical and rheological properties of waste edible vegetable oil rejuvenated asphalt binders," Construction and Building Materials, Elsevier, Netherlands, Jun. 17, 2014, 66: 286-298.

Bailey et al., "The use of vegetable oil as a rejuvenator for asphalt mixtures," 5th Eurasphalt & Eurobitume Congress, Jan. 1, 2012, pp. 1-10.

Oldham et al., "Application of a bio-binder as a rejuvenator for wet processed asphalt shingles in pavement construction," Construction and Building Materials, Jul. 2015, 86: 75-84.

Hallizza et al., "Investigation on physical properties of waste cooking oil—Rejuvenated bitumen binder," Construction and Building Materials, Dec. 2012, 37: 398-405.

Anonymous, "Bituminous pavement liquid rejuvenating," UFGs-32 01 13.64, Feb. 2017, pp. 1-10 Retrieved from the Internet: URL:https://www.wbdg.org/FFC/DOD/UFGS/UFGS%2032%2001%2013.64.pdf [retrieved on Jul. 9, 2021].

Anonymous, "Reclamite (asphalt pavement rejuvenating agent")" Jan. 2021, pp. 1-3 Retrieved from the Internet: URL:https://tricorrefining.com/reclamite/php [retrieved on Jul. 9, 2021].

Anonymous, Reclamite pavement rejuvenator, Jan. 2021, p. 1 Retrieved from the Internet: URL: https://tricorrefining.com/pdf/Reclamite%20Full%20page.pdf, retrieved on Jul. 9, 2021].

Anonymous, "Rejuvenating treatment preserves runway, grooving," Pavement Preservation Journal, Spring 2012, pp. 25-26 Retrieved from the Internet: URL:https:tricorrefining.com/pdf/rejuvenating%20treatment%20preserves%runway%20grooving%202012.pdf.

Anonymous, "Reclamite, asphalt rejuvenating agent, specification sheet," Jan. 2021, pp. 1-1 Retrieved from the Internet: URL:https://tricorrefining.com/pdf/reclamite%20specification%20.pdf [retrieved on Jul. 9, 2021].

Anonymous, "Reclamite, MSDS sheet," Aug. 2005, pp. 1-4 Retrieved from the Internet: URL:https://tricorrefining.com/pdf/reclamite%20US.pdf [retrieved on Jul. 9, 2021].

Shoenberger, "Rejuvenators, rejuvenator/sealers, and seal coats for airfield pavements ERDC/GSL TR-03-1," Feb. 2003, pp. 1-122 Retrieved from the Internet: URL:https://apps.dtic.mil/sti/pdfs/ADA412361.pdf [retrieved on Jul. 8, 2021].

Howard et al., "Performance oriented guidance for Mississippi State University Mississippi chip seals—vol. 1," Final Report PHWA/MX-DOT-RD-13-211—vol. 1, Dec. 17, 2013, pp. 1-191.

Howard et al., "Performance oriented guidance for Mississippi State University Mississippi chip seals—vol. II," Final Report FHWA/MS-DOT-RD-13-211—vol. II, Dec. 31, 2013.

Anonymous, "Gilsonite modified asphalt emulsion seal coats," UFGS-32 01 13.63, Feb. 2016 Change 1-08/16m Aug. 2916, pp. 1-21 Retrieved from the Internet: URL:https://www.wbdg.org.FFC/DOD/UFGS/UFGS%2032%2001%2013.63.pdf [Retrieved on Jul. 8, 2021].

Anonymous, "Bituminous seal and fog coats," UFGS-32 01 13, Aug. 2008, pp. 1-20 Retrieved from the Internet: URL:http://citeseerx.ist.psu.edu/viewdoc/download?doi=10.1.1.204.996&rep1&type=pdf [retrieved on Jul. 8, 2021].

Braham et al., "Characterising emulsion effects on aged asphalt concrete surfaces using bending beam rheometer mixture beams," The International Journal of Pavement Engineering, Aug. 2015, 16(7):620-631.

Cox et al., "Recommendations for seal treatment rejuvenation specifications based on bending beam rheometer testing of mixture beams," Transportation Research Record, Jan. 2015, 2473(1): 23-32.

Miller and Bellinger, "Distress identification manual for the long-term pavement performance program. No. FHWA-HRT-13-092," 2014, 132 pages.

European Article 94(3) Communication re EP16742560.2, Jul. 23, 2021, 27 pages.

* cited by examiner

BIOBASED ASPHALT REJUVENATING EMULSION

CROSS REFERENCE TO RELATED APPLICATIONS

This application is a continuation of application Ser. No. 15/744,812 filed Jan. 14, 2018 and now allowed, which is a national stage filing under 35 U.S.C. § 371 of International Application No. PCT/US2016/042495 filed Jul. 15, 2016, which claims priority under 35 U.S.C. § 119 to U.S. Provisional Patent Application No. 62/192,930 filed Jul. 15, 2015 and U.S. Provisional Patent Application No. 62/262,701 filed Dec. 3, 2015, the disclosure of each are herein incorporated by reference in their entirety.

TECHNICAL FIELD

This invention relates to modified asphalt emulsions for road surface treatments.

BACKGROUND

Asphalt concrete, also known as asphalt pavement, is a composite material that includes mineral aggregate and an asphalt (bitumen) binder which hardens to form a robust surface. Asphalt pavement deteriorates over time from oxidation of asphalt binder, heavy loads and varying climatic conditions. One method for restoring or repairing deteriorated asphalt pavement is to remove and replace the existing pavement with either newly prepared or recycled pavement. Removal and replacement, however, is expensive and wasteful.

SUMMARY OF THE INVENTION

Rather than removing and replacing deteriorated pavement, it is preferable to restore the pavement using a surface treatment. In one aspect, this disclosure is directed at a polymer-modified asphalt rejuvenating emulsion comprising:

an asphalt phase comprising an asphalt and at least one biobased rejuvenating agent;

an aqueous phase comprising water and an emulsifying agent; and one or more polymers included in the asphalt phase, the aqueous phase or both.

In another aspect, this disclosure provides a method for rejuvenating deteriorated asphalt, which method comprises:

a) providing a polymer-modified asphalt emulsion comprising an asphalt phase which includes an asphalt and at least one biobased rejuvenating agent, an aqueous phase which includes water and an emulsifying agent, and one or more polymers included in the asphalt phase, the aqueous phase or both; and (b) applying the asphalt emulsion to a deteriorated asphalt pavement surface.

Another aspect of this disclosure is directed to a rejuvenated asphalt pavement comprising a polymer-modified asphalt rejuvenating emulsion atop a deteriorated asphalt pavement, the rejuvenating emulsion containing an asphalt phase comprising an asphalt and at least one biobased rejuvenating agent, an aqueous phase comprising water and an emulsifying agent, and one or more polymers included in the asphalt phase, the aqueous phase or both.

The disclosed polymer-modified asphalt rejuvenating emulsions containing biobased rejuvenating agents are suitable for road maintenance of deteriorated asphalt pavement, thereby extending the life and service of the pavement.

DETAILED DESCRIPTION

The term "about" refers to a range of numbers that is considered equivalent to the recited value (e.g., having the same function or result). In many instances, the term "about" may include numbers that are rounded to the nearest significant figure.

The term "biobased" refers to compositions from natural or biological resources, including derivatives or modifications thereof.

The term "polymer" includes, independently, homopolymers, copolymers, terpolymers, block copolymers, segmented copolymers, graft copolymers, and any mixture or combination thereof.

The term "deteriorated" refers to cracked, aged, oxidized or distressed asphalt pavement, for example distressed includes asphalt pavement identified by Miller, John S., and William Y. Bellinger. Distress identification manual for the long-term pavement performance program. No. FHWA-HRT-13-092. 2014.

The term "emulsifying agents" refer to surfactants (including biodegradable surfactants) and to stabilizing agents. Emulsifying agents maintain the asphalt material in a stable suspension and control the emulsion breaking time, where the breaking time is the time required for the emulsified asphalt materials to separate from the aqueous phase permitting water evaporation and formation of a cured or set coating.

The term "meth" in parentheses, such as "(meth)acrylate," refers either to the acrylate or to the methacrylate, or mixtures of both. Similarly, the term (meth)acrylamide refers either to the acrylamide or to the methacrylamide, or mixtures of both.

Numerical ranges expressed using endpoints include all numbers subsumed within that range (e.g. 1 to 5 includes 1, 1.5, 2, 2.75, 3, 3.80, 4 and 5).

All percentages are weight percentages.

Disclosed is an asphalt rejuvenating emulsion that includes at least one biobased rejuvenating agent in the asphalt phase of the emulsion. Additionally, one or more polymers may be added to either an asphalt phase, the aqueous phase, or both phases of the asphalt rejuvenating emulsion to enable an asphalt pavement surface treatment or an interlayer treatment in conjunction with other treatments. These treatments may be used, for example, as a rejuvenator, scrub seal, fog seal, sand seal, chip seal, tack coat, bond coat, crack filler or as a material for prevention of reflective cracking. The treatments enable use of a wide variety of asphalts for restoring and rejuvenating deteriorated road pavement.

In certain embodiments, the rejuvenating agent in the asphalt phase may revitalize the asphalt and permit continued use and service on roadways while the polymer may offer durability to the pavement as well as potentially filing surface cracks or preventing the propagation of such cracks.

The disclosed emulsion may be a mixture of components that interact with one another. As a consequence, the concentration of one component may be increased within certain limits if the concentration of another is correspondingly decreased, without significantly altering the properties of the resulting composition. The disclosed emulsion may be applied to an existing base or substrate of a pavement. The disclosed emulsion includes an asphalt phase which includes asphalt and at least one rejuvenating agent, an aqueous phase, which includes water and emulsifying agents, and one or more polymers included in either or both of the phases. The emulsion provides a cationic, anionic, non-ionic, or neutral character to the final emulsion depending upon the desired emulsion's electrochemical properties or the intended emulsion use, for example, the surface type on which the emulsion is to be applied. The disclosed emulsion desirably includes substantial asphalt content. For example, the asphalt concentration may be about 30% to 70% of the total weight of the emulsion.

Various asphalt grades may be used in the disclosed asphalt emulsion composition depending on the expected pavement temperatures. The asphalt composition grades used in the emulsion may be defined by the Performance Grade (PG) values of the Strategic Highway Research Program (SHRP) or the American Association of State Highway and Transportation Officials (AASHTO) M320 standards. The asphalt composition grades may for example include about PG-94 (about 5-10 pen) to about PG-52 (about 160-220 pen), about PG-88 (about 10-20 pen) to about PG-64 (about 50-70 pen), or about PG-64 (about 50-70 pen) to about PG-52 (about 160-220 pen).

The asphalts used may be, for example, oxidized or air-blown asphalts, non-oxidized asphalts and blends thereof. In other aspects, the asphalt includes, but is not limited to, asphalt produced from atmospheric distillation, vacuum distillation, solvent extraction, air, or combinations of these methods. Still other asphalts may include naturally occurring asphalts such as gilsonite, asphaltites, and the like.

Asphalt blowing, also referred to as oxidation or air rectification, may be used to produce oxidized or air blown asphalt of desired consistency from a softer asphalt than the final asphalt product yielded by the blowing process. The desired result of the blowing process is an increase in softening point and a reduction in penetration values over that of the starting, base asphalt. Typically, the blowing process includes heating the base asphalt, generally to a temperature of 232.2° C. (450° F.) to 260° C. (500° F.), and blowing air into the hot asphalt for a period of time required to yield the desired properties. The blowing process is a temperature-time dependent process with an inverse relationship of temperature and time. Thus, at higher temperatures the blowing time is generally less than the time required to achieve the same properties at lower temperature. The exchange surface or contact surface between the hot asphalt and the air forced into it generally also is a factor in determining the blowing process length and the required air quantity.

Maltenes are the non-asphaltene fraction of asphalt, referred to as deasphalted or deasphaltened oil. The maltene fraction of asphalt includes polar resins, and aromatic and saturated solvents. A deteriorated asphalt may exhibit a low level of maltenes. Petroleum based rejuvenating agents, such as for example, Reclamite RA-1 from Tricor Refining, LLC have been used to replenish maltenes in asphalt pavement. However, such petroleum based rejuvenating agents are not renewable resources. In accordance with this disclosure, the deficiency of the maltene fraction in deteriorating asphalt may be made up by replacing it with a biobased rejuvenating agent. In certain embodiments, the biobased rejuvenating agent is capable of penetrating the surface of the aged and deteriorated asphalt to replenish at least a portion of the maltene fraction with, for example, a biobased oil or ester thereof and restore some of the original properties to the asphalt. The amount of the biobased rejuvenating agent in the emulsion can be adjusted depending on the pavement surface condition where the emulsion will be applied. If the surface is deteriorated asphalt concrete, the amount of biobased rejuvenating agent can be increased to ensure adequate dosing of the deteriorated asphalt concrete to restore the maltene fraction of the deteriorated asphalt.

Biobased rejuvenating agents may include oils or esters from natural or biological resources, including derivatives or modifications thereof. Without being bound by theory, it is believed that the biobased rejuvenating agent may function as softening agents for the bitumen in asphalt pavement. The current US Army Corps of Engineers (USACE) unified facilities guide specification (UFGS) for bituminous rejuvenation (UFGS 02787) suggests that the asphalt cement or binder recovered from the upper 9.5 mm of a pavement shall have a decrease in viscosity of at least 40% with respect to untreated material. Non-limiting examples of biobased rejuvenating agents include one or more of a vegetable oil or ester thereof, a seed oil or ester thereof, a soybean oil or ester thereof, a corn oil or ester thereof, a palm oil or ester thereof, a canola oil or ester thereof, a safflower oil or ester thereof, a sunflower oil or ester thereof, a citrus oil or ester thereof, pine oil or ester thereof, a rosin oil or ester thereof, or a biobased fatty acid ester. Exemplary commercially available rejuvenating agents include those available from Cargill Incorporated under the Agri-Pure Gold brand (such as Agri-Pure Gold 53, 55, 63S, 67, 135, 142S, 200, 500, 750S, and 2000) and the Anova® brand asphalt rejuvenators, those available from Arizona Chemical, LLC under the SYLVA-ROAD™ brand, and those available from the Archer Daniels Midland Company. In certain embodiments, seed oils may be preferred rejuvenating agents. In other embodiments, the tree based oils such as pine oil or rosin oil may be preferred.

The asphalt rejuvenating emulsion preferably employs biobased rejuvenating agents (sometimes also called recycling agents) in amounts suitable to permit the penetration of the biobased rejuvenating agent into the surface of the aged and deteriorated asphalt. The amount of biobased rejuvenating agent may for example be from about 0.5%, about 1%, and preferably about 2% to about 15%, 10% or preferably 8% by total weight of the emulsion. The ratio of the biobased rejuvenating agent to the polymer may for example be from 1:10 to 5:1, from 1:3 to 3:1, from 1:2 to 2:1, or about 1:1. The amount of biobased rejuvenating agent may also be such that an asphalt's viscosity is restored for example to about 1,000 to about 3,000 centipoise at 60° C. Those of ordinary skill in the art are capable of selecting a specific biobased rejuvenating agent and the specific amount of the rejuvenating agent in the emulsion to achieve the desired restoration of a deteriorated asphalt pavement.

The asphalt rejuvenating emulsions of this disclosure include one or more polymers in the asphalt phase, the aqueous phase or both. Exemplary polymers include those that assist in providing desired properties for the asphalt emulsion residue, for example by, providing a stress-absorbing layer that strongly adheres to the underlying pavement, by providing a non-tacky surface, or by providing a polymer with a non-swelling nature. The polymers may for example be about 1%, 2% or 3% to about 15%, 10% or 6% by total weight of the emulsion. The selection of a specific polymer or polymers for a rejuvenating application may depend upon many variables such as, for example, the type of pavement, pavement conditions, weather cycles, seasonal weather conditions, traffic volumes, etc. Those of ordinary skill in the art with knowledge of this disclosure are capable of selecting an appropriate polymer or polymers to assist in the desired rejuvenation of a particular pavement. Additionally, those of ordinary skill in the art will recognize that the combination of polymers in one or both phases of the emulsion may provide particular advantages in rejuvenating pavement.

In some embodiments, the asphalt phase incorporates one of more polymers as a modifier to enhance specific physical characteristics of the resulting residue. Exemplary polymers include those that assist in providing desired properties for the asphalt emulsion residue. The polymers may for example be about 4% to 8% by weight of the asphalt phase or about 1% to about 15% by total weight of the emulsion.

Various embodiments of the asphalt rejuvenating emulsion of this disclosure may include any elastomer or plastomer. Non-limiting examples of such polymers include styrene-butadiene rubber, styrene-butadiene-styrene rubber, polychloroprene, styrene butadiene plastomers, polyurethanes, thermoplastic olefins (for example, oxidized polyethylene wax or ethylene terpolymer), thermoplastic polyamides, or acrylate terpolymers (for example, glycidyl methacrylate).

In other embodiments, the one or more polymers may be utilized in the emulsion as a dispersion and added to the aqueous phase. Exemplary lattices of styrene butadiene rubber, styrene-butadiene-styrene and polychloroprene as well as others may be incorporated into the aqueous phase of the asphalt rejuvenating emulsion.

In some embodiments, acrylic polymers may be well suited for use in the asphalt rejuvenating emulsions. Acrylic polymers are often supplied as a dispersion and therefore may be included in the aqueous phase of the emulsion. The acrylic polymer or copolymers are preferably derived from acrylate monomers. The acrylate monomers may for example be based on (meth)acrylic acid, esters of (meth)acrylic acid, (meth)acrylamide, (meth)acrylonitrile and derivatives of these acrylate monomers. Exemplary esters of (meth)acrylic acids include, but are not limited to, alkyl and hydroxyalkyl esters, e.g., methyl (meth)acrylates, ethyl (meth)acrylates, butyl (meth)acrylates, hydroxyethyl (meth) acrylate, isobornyl (meth)acrylate, and longer chain alkyl (meth)acrylates such as ethylhexyl (meth)acrylate, lauryl (meth)acrylate, cetyl (meth)acrylate, and stearyl (meth)acrylate. Derivatives of (meth)acrylamide include, but are not limited to, alkyl substituted (meth)acrylamides, e.g., N,N-dimethyl (meth)acrylamide, N,N-dipropyl (meth)acrylamide, t-butyl (meth)acrylamide, N-octyl (meth)acrylamide, and longer chain alkyl (meth)acrylamides such as N-lauryl (meth)acrylamide and N-stearyl (meth)acrylamide. The acrylic polymers also include polymers commonly known as acrylics, acrylate polymers, polyacrylates or acrylic elastomers. Acrylate polymers belong to a group of polymers which could be referred to generally as plastics while acrylic elastomer is a general term for a type of synthetic rubber whose main component is an acrylic acid alkyl ester (for example, an ethyl or butyl ester).

Exemplary copolymers include polymers derived from polyolefins such as vinyl acetate, vinyl chloride, vinylidene chloride, styrene, substituted styrene, butadiene, unsaturated polyesters, ethylene and the like. In some embodiments, the acrylic copolymer is derived from acrylate monomers and mixtures thereof and polymerized with styrene or ethylene. In still other embodiments, the acrylic copolymer is derived from butyl acrylate and copolymerized with styrene or ethylene. In yet other embodiments, the copolymer may be an acrylonitrile butadiene.

Exemplary acrylic polymers or copolymers include those available from the BASF Corporation under the ACRONAL™ brand (such as ACRONAL NX 4627 and ACRONAL NX 4627 X) and those available from Bayer MaterialScience AG under the BAYHYDROL™ brand.

Other exemplary acrylic polymers or copolymers are available from Michelman under the LICOMER™ brand, from Wacker under the VINNAPAS™ brand, from Synothomer under the REVACRYL™ brand, from Arkema under the ENCOR™ brand, and from Westlake under the EBAC™ brand.

With certain applications, it may be desirable to incorporate one or more polymers in each of the asphalt phase and the aqueous phase. The incorporation of multiple polymers in this manner may permit the selective combination to achieve desired physical characteristics. Alternatively, it may be desirable in certain embodiments to incorporate different polymers into a single phase of the asphalt rejuvenating emulsion.

There are typically four categories of emulsifying agents, namely cationic, anionic, amphoteric and nonionic. Depending on the type of emulsifying agent used, an acid or a base may be needed to activate the emulsifying agent. When cationic emulsifying agents are used, acid may be added to adjust the emulsion pH to between 1.0 and 7.0. Suitable acids include inorganic acids, for example hydrochloric acid and phosphoric acid. The acid promotes a positive charge on the emulsifying agent. A subcategory of cationic emulsifying agents, known as quaternary ammonium salts, do not require acid activation because the charge is built into the emulsifying agent.

When anionic emulsifying agents are used, base may be added to adjust the emulsion pH to between 7.0 and 12.0. Suitable bases include inorganic bases, for example sodium hydroxide and potassium hydroxide. The base promotes a negative charge on the emulsifying agent.

When amphoteric emulsifying agents are used both the cationic and anionic chemical functionality are built into the same molecule. Therefore, either functionality may be activated; the cationic portion may be activated by acid or the anionic portion may be activated by base.

When nonionic emulsifying agents are used, it may not be necessary to activate the emulsifying agent with either acid or base.

The amount of emulsifying agent should preferably be sufficient to maintain a stable emulsion. The concentration can vary based on the type of emulsifying agents used and other components of the emulsion but is generally from greater than 0 to about 5% by weight of the emulsion, for example from about 0.01% to about 3.0% by weight of the emulsion.

Exemplary cationic emulsifying agents include polyamines, fatty amines, fatty amido-amines, ethoxylated amines, propoxylated amines, diamines, imidazolines, quaternary ammonium salts, and mixtures thereof. Commercial cationic emulsifying agents include, for example, those available from Akzo Nobel Surface Chemistry under the REDICOTE™ brand (including REDICOTE 4819, REDICOTE E-64R, REDICOTE E16, REDICOTE E-9, REDICOTE EM-44, REDICOTE C-346, REDICOTE E-7000 and REDICOTE E-70), and from MeadWestvaco Corporation under the INDULIN™ brand (including INDULIN F-80, INDULIN DF-60, INDULIN DF-40, INDULIN DF-42, INDULIN DF-30, INDULIN R-20, INDULIN AA 54, INDULIN AA 56, INDULIN AA 57, INDULIN AA-71, INDULIN AA-78, INDULIN AA-83, INDULINAA-86 and INDULIN AA-89).

Exemplary anionic emulsifying agents include alkali metal or ammonium salts of fatty acids, alkali metal polyalkoxycarboxylates, alkali metal N-acylsarcosinates, alkali metal hydrocarbylsulphonates, for example, sodium alkylsulphonates, sodium arylsulphonates, sodium alkylarylsulphonates, sodium alkylarenesulphonates, sodium ligno-sulphonates, sodium dialkylsulphosuccinates and sodium alkyl sulphates, long chain carboxylic and sulphonic acids, their salts and mixtures thereof.

Exemplary amphoteric emulsifying agents include betaines and amphoteric imidazolinium derivatives.

Exemplary non-ionic emulsifying agents include ethoxylated compounds and esters, for example ethoxylated fatty alcohols, ethoxylated fatty acids, sorbitan esters, ethoxylated sorbitan esters, ethoxylated alkylphenol s, ethoxylated fatty amides, glycerine fatty acid esters, alcohols, alkyl phenols, and mixtures thereof.

The emulsion may contain other additives to adjust the emulsion properties in relation to the planned use, application method, and storage conditions. These include, for example, mineral salts, thickening agents, stabilizing agents, anti-freeze agents, adhesion promoters, biocides, pigments and the like.

Exemplary stabilizing agents may include polysaccharides, e.g., biodegradable glucopyranose, glycans such as β-D glucans, scleroglycans (CAS No. 39464-87-4), schizophyllan (CAS No. 9050-67-3), laminaran (CAS No. 9008-22-4), cinerean, lentinan (CAS No. 37339-90-5), curdlan (CAS No. 54724-00-4) glucose polymers, preservatives, and the like. Other stabilizing agents may include cellulose compounds or derivatives thereof, e.g. microcrystalline cellulose (AVICEL™ RC591), ethylcellulose and gunge (NA-TRASOL™).

Exemplary thickening agents include scleroglucan, scleroglucan modified with glyoxal or with another reactant, guar gum, gum arabic, ghatti gum, karaya gum, gum tragacanth, locust bean gum, xanthan gum, and water-soluble polyurethanes resulting in particular from the reaction of one or more polyisocyanates with one or more polyols chosen from polyester polyols and polyether polyols.

Other exemplary thickening agents are available from Latexfalt, b.v. Koudekerd a/d Rijn, The Netherlands and as described in WO 2009/113854 A1.

The weight percentage of the asphalt phase of the emulsion may for example represent from about 30% to about 70% of the total emulsion weight. The corresponding aqueous phase of the emulsion may for example represent from about 70% to about 30% of the total emulsion weight. The emulsifying agents or other additives may represent from about 0.01% to about 3.0% of the total emulsion weight, and preferably from about 0.5% to about 3.0% of the total emulsion weight.

The disclosed asphalt emulsions may be prepared by mixing, in no specific order, the emulsifying agent, the optional polymer and water and adjusting the pH of the resulting emulsifying agent solution depending on the emulsifying agent type. The emulsifying agent solution may for example be heated from slightly above room temperature to up to about 70° C. Separately, the asphalt, the biobased rejuvenating agent and optional polymer blend may for example be heated to 130° C. to 160° C., depending upon the viscosity of the asphalt and biobased rejuvenating agent blend used. For example, a low viscosity asphalt such as a PG 52 might be heated to only 130° C. and a high viscosity asphalt such as a PG 64 might be heated as high as 160° C. The emulsion may be formed at ambient pressure or under pressure with subsequent cooling to below 100° C. (212° F.) before exposure to the atmosphere. The asphalt phase and the emulsifying agent solution may be mixed or injected into a high-speed, high shear mechanical mixer, such as a colloid mill or other equipment capable of emulsifying the constituents to produce the asphalt emulsion. The temperature of the finished emulsion desirably is maintained, for example, below about 100° C. (212° F.), for example from about 71° C. (160° F.) to 99° C. (210° F.). The use of such temperatures permits operation of the mixer at ambient pressure and avoids boiling the aqueous phase and consequent interference with the emulsification process. The ratio of the asphalt and emulsifying agent solution is adjusted to produce an asphalt emulsion containing a desired amount of asphalt material, which may for example be from 30 to 70%.

In the above-described method, the polymer may be added into the emulsifying agent solution, the asphalt phase or both. Alternatively, the asphalt emulsion can be produced with direct injection, where the asphalt, biobased rejuvenating agent and emulsifying agent (without the polymer) are injected into the colloid mill through individual supply lines and the polymer is directly injected into the asphalt supply line just ahead of the colloid mill. The polymer-modified asphalt with a biobased rejuvenating agent can also be produced by post-addition, where the desired amount of the polymer is added into a pre-manufactured emulsion containing asphalt and biobased rejuvenating agent but without the polymer.

The emulsion should remain stable during storage and typically may be stored for about 14 days, depending on the constituents. Some settling may occur, but a light (simple) agitation of the emulsion usually re-disperses asphalt into the emulsion.

A final emulsion may also be prepared from a concentrate emulsion by diluting the concentrate emulsion with sufficient additional water to provide the desired asphalt or additive content in the final emulsion.

The specific weight percentages of the asphalt phase and the aqueous phase in the final emulsion may be chosen depending on factors such as the preexisting pavement composition or the base course materials and conditions, or the number of planned applications, the desired cure time, and user agency regulations or specifications. Similarly, the emulsifying agents, stabilizing agents, and other additives may be adjusted for specific application conditions, asphaltic materials, and substrates.

The final emulsion is preferably formulated such that, after application, the emulsion rejuvenates the deteriorated asphalt by restoring the aromatic content and forms a stress absorbing layer which strongly adheres to the underlying pavement.

The final emulsion may be prepared in advance of its application or at a work site immediately before its application. If desired, the concentrate may be mixed with water at a rate sufficient to produce the desired final emulsion on a continuous basis during application using metering and mixing equipment known to those skilled in the art.

The final asphalt emulsion may be applied by hand spreading, conventional spreading, spraying, or other techniques. A recommended application rate may be, for example, about 0.045 to about 2.7 liters/sq. meter (about 0.01 to about 0.60 gal/sq. yd.) or about 0.14 to about 2.0 liters/sq. meter (about 0.03 to about 0.45 gal/sq. yd.). The emulsion can be applied in multiple passes over the substrate layers at lower rates to achieve a comparable product, where the total application rate is equal to the sum of the multiple passes and is from about 0.045 liters/sq. meter to about 2.7 liters/sq. meter (about 0.01 to about 0.60 gal/sq. yd.). For example, an emulsion may be applied in three passes over the substrate layer at application rates of 0.04 liters/sq. meter (about 0.01 gal/sq. yd.) each, or a total application rate of about 0.12 liters/sq. meter (0.03 gal/sq. yd.). The emulsion application rate may also vary depending on the specified application conditions, emulsion composition, the surface to which it is applied, and the nature of the permanent materials or base (viz., the pavement structure), and other similar factors.

The emulsion temperature during application may, for example, be from about 4° C. (40° F.) to about 99° C. (210° F.), from about 49° C. (120° F.) to about 77° C. (170° F.), or from about 38° C. (100° F.) to about 71° C. (160° F.). Alternatively, the emulsion may be at ambient temperature (e.g. about 20° C. to 25° C. (68° F. to 77° F.), but if so applied may require a longer curing time. The emulsion typically is placed on top of a deteriorated surface and is allowed to cure before traffic passes over the coated surface or additional pavement layer(s) are applied to the coated surface.

The emulsions may generally be formulated to achieve a desired residue upon breaking of the emulsion and drying or removal of the aqueous portion. The procedures for recovering the residue are set forth in the Examples section of this disclosure. In certain embodiments, residue recovery may generally range from about 30% to about 70% by weight of the emulsion.

Complex modulus may be another characteristic suitable for demonstrating the effectiveness of the emulsion. In certain applications, the complex modulus can be an indication of the stiffness or strength of the residue of the emulsion. Complex modulus is determined using a dynamic shear rheometer to, often over an extended period of time, to determine the characteristics of the residue under controlled stress and strain. The procedure for determining the complex modulus is set forth in the Examples section of this disclosure. The specific grade of asphalt and the type and amount of polymer employed in the emulsion may impact the reported complex modulus.

The disclosed composition is further illustrated in the following non-limiting examples. Various modifications and alterations of the disclosed compositions will be apparent to those skilled in the art without departing from the scope of this disclosure.

Examples

Asphalt Emulsion Residue Procedure: Two methods were used to recover asphalt residues from exemplary emulsions. Emulsion residue verification was determined in accordance with ASTM International D7944-15 Standard Practice for Recovery of Emulsified Asphalt Residue Using a Vacuum Oven. This practice is suitable for recovery of the residue of emulsified asphalts composed principally of a semisolid or liquid asphaltic base, water and an emulsifying agent. Asphalt base may be pre-modified with polymeric modifiers or latex polymer modifiers may be incorporated into the emulsified asphalt through co-milling or post emulsified asphalt production blending. The method consists of a three hour thin film recovery of residue from an emulsion in a 60° C. vacuum oven.

In certain Examples, emulsion residues for subsequent physical property evaluation, complex modulus testing, were obtained in accordance with ASTM International D7497-09 Standard Practice for Recovering Residue from Emulsified Asphalt Using Low Temperature Evaporative Technique. The procedure is used to obtain a residue from an emulsified asphalt that may be used for further testing in devices such as a dynamic shear rheometer. The lower evaporative temperatures of this procedure provide conditions that are very close to that of application techniques for these materials. This practice is used in place of recovery techniques at higher temperatures that are not representative of typical emulsion application techniques. Under D7497-09, emulsions in thin films are dried for one day under forced airflow at 60° C. to provide emulsion binder residues.

Complex Modulus Test procedure: A dynamic shear rheometer (DSR) is utilized to determine the complex modulus. The test reports the complex modulus (G*) as an indicator of the stiffness or resistance of asphalt binder to deformation under load. Complex modulus and phase angle define resistance to shear deformation of an asphalt binder in the linear viscoelastic region. The Complex Modulus Test is conducted on residue recovered from asphalt emulsions in accordance with ASTM International D7175-15 Standard Test Method for Determining the Rheological Properties of Asphalt Binder Using a Dynamic Shear Rheometer. ASTM D7175-15 determines the dynamic modulus and phase angle of asphalt binders when tested in dynamic (oscillatory) shear using parallel plate geometry. It is applicable to asphalt binders having dynamic modulus values in the range from 100 Pa to 10 MPa. This range in modulus is typically obtained between 4 and 88° C. at 10 radians/second. Results are obtained at 50° C. using 25 mm diameter parallel plates at a 1 mm gap testing at 10 radian/second.

The materials used to create the Examples are set forth in Table 1.

TABLE 1

| Materials | |
| --- | --- |
| Asphalt | PG 64-22 from Ergon Asphalt & Emulsions, Inc. Jackson, MS. |
| Soy Derived Oil | RBD Soy Oil from Archer Daniels Midland Company, Chicago, IL. |
| Pine Derived Oil | SYLVAROAD ™ RP 1000 from Arizona Chemical, Jacksonville, FL. |
| Corn Derived Oil | RBD Corn Oil from Archer Daniels Midland Company, Chicago, IL. |
| Peanut Derived Oil | Lou-Ana Refined Peanut Oil from Ventura Foods, Opelousas, LA. |
| RA-1 Rejuvenating Oil | RA-1 Petroleum-based Rejuvenating Oil from Tricor Refining, LLC, Bakersfield, CA. |
| Emulsifying Agent | Redicote E-7000 from Akzo Nobel Surface Chemistry LLC, Chicago, IL. |
| HCL | Hydrochloric acid |
| Acrylic Latex | Acronal 4627X from BASF Corporation, Florham Park, NJ. |
| SBR Latex | Styrene-butadiene rubber |
| Neoprene | polychloroprene |

Examples 1-4 are polymer-modified asphalt emulsions produced utilizing various biobased rejuvenating agents. Each of the Examples were prepared by mixing the materials shown in Table 1 at the weight percentages indicated in Table 2. For all of the Examples, the emulsifying agent and acrylic latex were mixed with water and its pH adjusted to below 3 with HCl. The resulting emulsifying agent solution was heated from slightly above room temperature to about 40.° C. Separately, the asphalt and biobased rejuvenating agent blend were heated to about 130° to 160° C. The emulsifying agent solution and heated asphalt and rejuvenating agent blend were injected into a colloid mill to produce the asphalt emulsion. The temperature of the finished emulsion was maintained below about 100° C. (212° F.). Table 3 indicates the results of testing on each of the resulting emulsions for Examples 1-4. Each Example was tested for percent retention of solids on a 20 mesh sieve, viscosity and particle size. Additionally, the asphalt emulsion residue was recovered by Asphalt Emulsion Residue Procedure using ASTM International D7944-15. The recovered residue is reported in Table 3.

TABLE 2

| | | Formulations | | |
|---|---|---|---|---|
| Raw Material | Example 1 Wt % | Example 2 Wt % | Example 3 Wt % | Example 4 Wt % |
| Asphalt | 52.90 | 52.90 | 52.90 | 52.90 |
| Soy Derived Oil | 6.67 | | | |
| Sylva Road | | 6.67 | | |
| Corn Derived Oil | | | 6.67 | |
| Peanut Derived Oil | | | | 6.67 |
| Emulsifier | 2.00 | 2.00 | 2.00 | 2.00 |
| HCL | 0.20 | 0.20 | 0.20 | 0.20 |
| Acrylic Copolymer | 3.00 | 3.00 | 3.00 | 3.00 |
| water | 35.23 | 35.23 | 35.23 | 35.23 |
| | 100 | 100 | 100 | 100 |

TABLE 3

| | | Results | | |
|---|---|---|---|---|
| Emulsion Test | Example 1 | Example 2 | Example 3 | Example 4 |
| Sieve % | 0.072 | 0.093 | 0.08 | 0.046 |
| 25° C. Viscosity, sec | 140.26 | 90.91 | 74.65 | 134.48 |
| Particle Size, μm | 26.77 | 12.82 | 20.01 | 15.23 |
| Residue, % | 59.3 | 62.16 | 59.31 | 61.42 |

Example 5: Emulsions for Example 5 were prepared as described in Examples 1-4, with petroleum based RA-1 rejuvenating agent included for comparison purposes. The examples include 2% or 3% acrylic copolymer solids in the emulsion residues. The biobased rejuvenating agents were substituted at a level to provide an equivalent viscosity to a use level of approximately 10% RA-1 rejuvenating agent. Emulsions were dried in accordance with ASTM International D7497-09 to provide emulsion binder residues. Table 4 lists the measured complex modulus of the emulsion binder residues, as tested under the Complex Modulus Test. The chosen drying conditions illustrate the initial strength development of the asphalt emulsion binder after resumption of a traffic condition.

TABLE 4

| | | |
|---|---|---|
| | TABLE 4 | |
| | Measured Complex Modulus of Emulsion Residue at 50° C. | |
| Acrylic Copolymer Solids in | Polymer Level in the Emulsion | |
| Emulsion Residue | 2% | 3% |
| RA-1 Rejuvenating Oil | 5.63 | 6.32 |
| Peanut Derived Oil | 3.93 | 5.02 |
| Soy Derived Oil | 4.37 | 4.22 |
| Corn Derived Oil | 4.97 | 5.23 |
| Pine Oil | 3.61 | 3.55 |

Example 6: The strength development of polymer modified emulsions containing 2% or 3% polymer solids were tested over a period of several days after application and measured using Dynamic Shear Rheometry. The emulsions were prepared as in Examples 1-4. The emulsion residues were prepared using ASTM International D7497-09 and were aged by storing in a dark forced airflow oven at 60° C. for 10 days and the residue complex modulus values were measured at 1 day, 3 days, 7 days and 10 days aging. The results are reported in Table 5.

TABLE 5

| | Measure Complex Modulus of Emulsion Residue at 50° C. | | | | |
|---|---|---|---|---|---|
| | | Oven Curing Time at 60° C. | | | |
| | 0 day | 1 day | 3 day | 7 day | 10 day |
| | | RA-1 Rejuvenating Oil | | | |
| 2% Polymer | 5.63 | 8.73 | 13.00 | 20.20 | 25.80 |
| 3% Polymer | 6.32 | 10.10 | 14.20 | 23.00 | 26.90 |
| | | Peanut Derived Oil | | | |
| 2% Polymer | 3.93 | 5.63 | 8.65 | 11.10 | 13.30 |
| 3% Polymer | 5.02 | 5.97 | 9.57 | 10.40 | 12.10 |
| | | Soy Derived Oil | | | |
| 2% Polymer | 4.37 | 6.17 | 9.40 | 12.40 | 15.26 |
| 3% Polymer | 4.22 | 6.94 | 11.60 | 12.20 | 15.95 |
| | | Corn Derived Oil | | | |
| 2% Polymer | 4.97 | 7.87 | 12.12 | 13.18 | 14.90 |
| 3% Polymer | 5.23 | 8.16 | 11.30 | 14.74 | 15.20 |
| | | Pine Derived Oil | | | |
| 2% Polymer | 3.61 | 4.80 | 9.65 | 9.08 | 9.70 |
| 3% Polymer | 3.55 | 5.25 | 8.52 | 8.25 | 10.30 |

Table 5 shows measured complex modulus as a function of aging. These results demonstrate both the early strength development and aged strength of the acrylic-modified asphalt emulsions containing biobased rejuvenating agent as compared to the acrylic-modified asphalt emulsions containing the petroleum based RA-1 rejuvenating agent.

Example 7: Emulsions were prepared as described in Example 5, with biobased rejuvenating agents and polymer dispersions as set forth in Table 6. The polymers were incorporated to establish 2% and 3% acrylic copolymer solids in the emulsion residues. For comparative purposes results from emulsions containing an RA-1 rejuvenating agent with Neoprene, SBR Latex and an Acrylic Latex were formulated and tested. Biobased rejuvenating agents were substituted at a level to provide an equivalent viscosity to a use level of approximately 10% RA-1 rejuvenating agent. Emulsions were dried for one day under forced airflow at 60° C. to provide emulsion binder residues. Table 8 lists the measured complex modulus of the emulsion binder residues at 50° C. as a function of the type of oil and amount of acrylic polymer solids in the emulsion residue. The complex modulus illustrates the strength of the emulsion residue under controlled stress and strain representing a traffic condition. The chosen drying conditions illustrate the initial strength development of the asphalt emulsion binder after resumption of a traffic condition.

TABLE 6

| | Measured Complex Modulus of Emulsion Residue at 50° C. | |
|---|---|---|
| | Polymer Level in the Emulsion Residue | |
| | 2% | 3% |
| | RA-1 Rejuvenating Oil | |
| Neoprene | 0.80 | 0.85 |
| SBR Latex | 1.10 | 1.20 |
| Acrylic Latex | 5.63 | 6.32 |

TABLE 6-continued

| Measured Complex Modulus of Emulsion Residue at 50° C. | | |
| --- | --- | --- |
| | Polymer Level in the Emulsion Residue | |
| | 2% | 3% |
| Peanut Derived Oil | | |
| Neoprene | 2.36 | 3.04 |
| SBR Latex | 4.39 | 5.40 |
| Acrylic Latex | 3.93 | 5.02 |
| Soy Derived Oil | | |
| Neoprene | 3.68 | 4.84 |
| SBR Latex | 5.51 | 6.42 |
| Acrylic Latex | 4.37 | 4.22 |
| Corn Derived Oil | | |
| Neoprene | 4.54 | 5.76 |
| SBR Latex | 6.81 | 8.36 |
| Acrylic Latex | 4.97 | 5.23 |
| Pine Derived Oil | | |
| Neoprene | 3.68 | 3.72 |
| SBR Latex | 4.24 | 4.68 |
| Acrylic Latex | 3.61 | 3.55 |

Example 8: The strength development of polymer modified emulsions containing 2% or 3% polymer solids were tested over a period of several days after application and measured using Dynamic Shear Rheometry. The emulsions were prepared as in Example 5. After 1 day forced airflow drying at 60° C., the emulsion residues were aged by storing in a dark forced airflow oven at 60° C. for 10 days and the residue complex modulus values were measured at 1 day, 3 days, 7 days and 10 days aging. The results are reported in Table 7.

TABLE 7

TABLE 7
Measure Complex Modulus of Emulsion Residue at 50° C.

| | Oven Curing Time at 60° C. | | | | |
| --- | --- | --- | --- | --- | --- |
| | 0 day | 1 day | 3 day | 7 day | 10 day |
| RA-1 Rejuvenating Oil 2% Polymer | | | | | |
| Neoprene | 0.80 | 1.10 | 1.10 | 1.20 | 1.40 |
| SBR Latex | 1.10 | 1.50 | 1.80 | 2.00 | 2.10 |
| Acrylic Latex | 5.63 | 8.73 | 13.00 | 20.20 | 25.80 |
| 3% Polymer | | | | | |
| Neoprene | 0.85 | 1.20 | 1.60 | 1.70 | 2.20 |
| SBR Latex | 1.20 | 2.00 | 2.30 | 2.30 | 2.30 |
| Acrylic Latex | 6.32 | 10.10 | 14.20 | 23.00 | 26.90 |
| Peanut Derived Oil 2% Polymer | | | | | |
| Neoprene | 2.36 | 3.60 | 8.22 | 6.61 | 7.88 |
| SBR Latex | 4.39 | 7.85 | 11.70 | 15.00 | 17.50 |
| Acrylic Latex | 3.93 | 5.63 | 8.65 | 11.10 | 13.30 |
| 3% Polymer | | | | | |
| Neoprene | 3.04 | 4.21 | 10.80 | 14.50 | 8.21 |
| SBR Latex | 5.40 | 7.94 | 12.80 | 15.00 | 18.30 |
| Acrylic Latex | 5.02 | 5.97 | 9.57 | 10.40 | 12.10 |
| Soy Derived Oil 2% Polymer | | | | | |
| Neoprene | 3.68 | 5.79 | 15.60 | 11.20 | 14.17 |
| SBR Latex | 5.51 | 9.97 | 11.90 | 20.68 | 19.15 |
| Acrylic Latex | 4.37 | 6.17 | 9.40 | 12.40 | 15.26 |

TABLE 7-continued

TABLE 7
Measure Complex Modulus of Emulsion Residue at 50° C.

| | Oven Curing Time at 60° C. | | | | |
| --- | --- | --- | --- | --- | --- |
| | 0 day | 1 day | 3 day | 7 day | 10 day |
| 3% Polymer | | | | | |
| Neoprene | 4.84 | 7.43 | 10.20 | 14.10 | 15.32 |
| SBR Latex | 6.42 | 10.50 | 14.70 | 24.40 | 21.19 |
| Acrylic Latex | 4.22 | 6.94 | 11.60 | 12.20 | 15.95 |
| Corn Derived Oil 2% Polymer | | | | | |
| Neoprene | 4.54 | 7.74 | 13.10 | 20.10 | 21.60 |
| SBR Latex | 6.81 | 11.60 | 18.30 | 20.43 | 25.10 |
| Acrylic Latex | 4.97 | 7.87 | 12.12 | 13.18 | 14.90 |
| 3% Polymer | | | | | |
| Neoprene | 5.76 | 9.82 | 13.40 | 17.33 | 20.70 |
| SBR Latex | 8.36 | 13.20 | 19.30 | 24.74 | 27.00 |
| Acrylic Latex | 5.23 | 8.16 | 11.30 | 14.74 | 15.20 |
| Pine Derived Oil 2% Polymer | | | | | |
| Neoprene | 3.68 | 5.77 | 9.78 | 11.70 | 26.65 |
| SBR Latex | 4.24 | 6.60 | 9.93 | 11.60 | 14.00 |
| Acrylic Latex | 3.61 | 4.80 | 9.65 | 9.08 | 9.70 |
| 3% Polymer | | | | | |
| Neoprene | 3.72 | 5.80 | 9.80 | 15.88 | 13.78 |
| SBR Latex | 4.68 | 7.37 | 10.64 | 16.11 | 46.20 |
| Acrylic Latex | 3.55 | 5.25 | 8.52 | 8.25 | 10.30 |

Table 7 shows measured complex modulus as a function of aging. These results clearly demonstrate both the early strength development and aged strength of the neoprene, SBR Latex and Acrylic Latex modified asphalt emulsions containing biobased rejuvenating agent as compared to the neoprene, SBR and acrylic copolymer modified asphalt emulsions containing petroleum based RA-1 rejuvenating agent.

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

We claim:

1. A polymer-modified asphalt rejuvenating emulsion comprising:

a stable liquid dispersion containing an asphalt phase comprising an asphalt composition and about 0.5% to about 15%, based on a total weight of the emulsion, of at least one biobased rejuvenating agent, the asphalt composition containing an asphalt or blend of asphalts having a penetration grade of at least 50 pen;

an aqueous phase comprising water and an emulsifying agent; and one or more polymers included in the asphalt phase, the aqueous phase or both, wherein asphalt recovered from the upper 9.5 mm of a pavement having an upper surface treated with the rejuvenating emulsion has a viscosity of about 1,000 to about 3,000 centipoise at 60° C., and a decreased viscosity compared to asphalt recovered from the upper 9.5 mm of a pavement having an upper surface that has not been treated with the rejuvenating emulsion.

2. The emulsion of claim 1, wherein the asphalt phase comprises from about 30% to about 70% of the total weight of the emulsion.

3. The emulsion of claim 1, wherein the at least one biobased rejuvenating agent comprises a biobased oil or ester thereof.

4. The emulsion of claim 1, wherein the at least one biobased rejuvenating agent comprises one or more of a vegetable oil or ester thereof, a seed oil or ester thereof, a soybean oil or ester thereof, a corn oil or ester thereof, a palm oil or ester thereof, a canola oil or ester thereof, a safflower oil or ester thereof, a sunflower oil or ester thereof, a citrus oil or ester thereof, pine oil or ester thereof, a rosin oil or ester thereof, a biobased fatty acid ester, or a combination thereof.

5. The emulsion of claim 1, wherein the at least one biobased rejuvenating agent comprises about 2% to about 15% of the total weight of the emulsion.

6. The emulsion of claim 1, wherein the one or more polymers is an acrylic polymer.

7. The emulsion of claim 6, wherein the acrylic polymer comprises a butyl (meth)acrylate polymer, an ethyl (meth) acrylate polymer or a derivative thereof, a styrene-butyl acrylate copolymer, or an ethylene butyl acrylate copolymer.

8. The emulsion of claim 1, wherein the one or more polymers comprises an elastomer or plastomer.

9. The emulsion of claim 1, wherein the one or more polymers comprises styrene butadiene rubber, styrene-butadiene-styrene or polychloroprene.

10. The emulsion of claim 1, wherein the one or more polymers comprises about 1% to about 15% of the total weight of the emulsion.

11. The emulsion of claim 1, wherein the emulsifying agent comprises from about 0.01% to about 3.0% of the total weight of the emulsion.

12. A method for rejuvenating deteriorated asphalt, which method comprises:

a) providing a polymer-modified asphalt emulsion comprising a stable liquid dispersion containing an asphalt phase which includes an asphalt composition and about 0.5% to about 15%, based on a total weight of the emulsion, of at least one biobased rejuvenating agent, the asphalt composition containing an asphalt or blend of asphalts having a penetration grade of at least 50 pen, an aqueous phase which includes water and an emulsifying agent, and one or more polymers included in the asphalt phase, the aqueous phase or both; and b) applying the asphalt emulsion to a deteriorated asphalt pavement surface wherein asphalt recovered from the upper 9.5 mm of pavement to which the asphalt emulsion has been applied has a viscosity of about 1,000 to about 3,000 centipoise at 60° C., and has a decreased viscosity compared to asphalt recovered from the upper 9.5 mm of pavement to which the asphalt emulsion has not been applied.

13. The method of claim 12, wherein the asphalt phase comprises from about 30% to about 70% of the total weight of the emulsion.

14. The method of claim 12, wherein the one or more polymers comprise a butyl (meth)acrylate polymer, an ethyl (meth)acrylate polymer, a styrene-butyl acrylate copolymer, or an ethylene butyl acrylic copolymer.

15. The method of claim 12, wherein the at least one biobased rejuvenating agent comprises a biobased oil or ester thereof.

16. The method of claim 12, wherein the emulsifying agent comprises from about 0.01% to about 3.0% of the total weight of the emulsion.

17. The method of claim 12, comprising applying the emulsion to the deteriorated asphalt pavement surface in an amount of about 0.045 to about 2.7 liters per square meter.

18. The method of claim 12, comprising applying the emulsion to the deteriorated asphalt pavement surface at an emulsion temperature of about 4° C. to about 99° C.

19. A rejuvenated asphalt pavement comprising a polymer-modified asphalt rejuvenating emulsion atop a deteriorated asphalt pavement, the rejuvenating emulsion containing an asphalt phase comprising an asphalt composition and about 0.5% to about 15%, based on a total weight of the emulsion, of at least one biobased rejuvenating agent, the asphalt composition containing an asphalt or blend of asphalts having a penetration grade of at least bout 50 pen, an aqueous phase comprising water and an emulsifying agent, and one or more polymers included in the asphalt phase, the aqueous phase or both, wherein asphalt recovered from the upper 9.5 mm of pavement under the rejuvenating emulsion has a viscosity of about 1,000 to about 3,000 centipoise at 60° C., and has a decreased viscosity compared to asphalt recovered from the upper 9.5 mm of a pavement not under the rejuvenating emulsion.

20. The rejuvenated asphalt pavement of claim 19, wherein the at least one biobased rejuvenating agent comprises a biobased oil or ester thereof.

* * * * *